(12) United States Patent
Pires dos Reis Moreira

(10) Patent No.: US 12,298,933 B2
(45) Date of Patent: May 13, 2025

(54) MESSAGE BASED PROCESSOR WITH TRANSMISSION DISABLING MODE

(71) Applicant: Snap Inc., Santa Monica, CA (US)

(72) Inventor: Orlando Miguel Pires dos Reis Moreira, Eindhoven (NL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/555,473

(22) PCT Filed: Apr. 19, 2022

(86) PCT No.: PCT/EP2022/060300
§ 371 (c)(1),
(2) Date: Oct. 13, 2023

(87) PCT Pub. No.: WO2022/219201
PCT Pub. Date: Oct. 20, 2022

(65) Prior Publication Data
US 2024/0211430 A1    Jun. 27, 2024

(30) Foreign Application Priority Data
Apr. 16, 2021   (EP) .................................... 21290022

(51) Int. Cl.
*G06F 15/80* (2006.01)
*G06F 9/54* (2006.01)

(52) U.S. Cl.
CPC .............. *G06F 15/80* (2013.01); *G06F 9/546* (2013.01)

(58) Field of Classification Search
CPC .................................. G06F 15/80; G06F 9/546
See application file for complete search history.

(56) References Cited

U.S. PATENT DOCUMENTS 6,072,781 A    6/2000  Feeney et al.
8,302,109 B2 * 10/2012 Arimilli .................. G06F 9/545
                                                            719/321
(Continued)

FOREIGN PATENT DOCUMENTS

CN    117529710       2/2024
EP     3605401 A1     2/2020
(Continued)

OTHER PUBLICATIONS

"European Application Serial No. 21290022.9, Extended European Search Report mailed Nov. 18, 2021", 11 pgs.
(Continued)

*Primary Examiner* — Corey S Faherty
(74) *Attorney, Agent, or Firm* — Schwegman Lundberg & Woessner, P.A.

(57) ABSTRACT

A message based processor comprises at least one processor cluster with a plurality of cluster elements each having a respective addressable storage space to store a state value indicative of its state, message handling utilities that are configured to receive input messages that designate specific ones of the plurality of cluster elements, and computation utilities that are configured to update a state value stored in the respective storage element of the designated cluster element. The addressable storage space of each cluster element further stores an operational mode indicator that is indicative of an operational mode of each cluster element. The operational mode is selected from at least one of transmission enabling operational mode and transmission disabling operational mode. The message handling utilities selectively transmit output messages for a cluster element to one or more cluster elements based on the operational mode.

20 Claims, 7 Drawing Sheets

(56) References Cited

U.S. PATENT DOCUMENTS

| | | | |
|---|---|---|---|
| 8,984,256 B2* | 3/2015 | Fish | G06F 9/3851 712/14 |
| 10,255,077 B2* | 4/2019 | Ben-Kiki | G06F 9/3851 |
| 11,321,126 B2* | 5/2022 | Cayssials | G06F 15/80 |
| 11,842,230 B2 | 12/2023 | Pires Dos Reis Moreira et al. | |
| 11,960,946 B2 | 4/2024 | Yousefzadeh et al. | |

FOREIGN PATENT DOCUMENTS

| | | |
|---|---|---|
| EP | 3716153 A1 | 9/2020 |
| EP | 4075275 A1 | 10/2022 |
| EP | 4323873 | 2/2024 |
| KR | 20240016953 | 2/2024 |
| WO | WO-2022219201 A1 | 10/2022 |

OTHER PUBLICATIONS

"International Application Serial No. PCT/EP2022/060300, International Search Report mailed Jul. 27, 2022", 5 pgs.

"International Application Serial No. PCT/EP2022/060300, Written Opinion mailed Jul. 27, 2022", 7 pgs.

"Chinese Application Serial No. 202280040516.1, Voluntary Amendment filed Jun. 19, 2024", W/ Current English Claims, 34 pgs.

"European Application Serial No. 22719308.3, Response to Communication pursuant to Rules 161(1) and 162 EPC filed Jan. 5, 2024", 17 pgs.

"European Application Serial No. 21290022.9, Noting of loss of rights pursuant to Rule 112(1) EPC mailed May 16, 2023", 2 pgs.

"International Application Serial No. PCT/EP2022/060300, International Preliminary Report on Patentability mailed Oct. 26, 2023", 9 pgs.

"PCT Direct Letter submitted with International Application Serial No. PCT/EP2022/060300 mailed Apr. 19, 2022", 34 pgs.

\* cited by examiner

MESSAGE BASED PROCESSOR WITH TRANSMISSION DISABLING MODE

CLAIM OF PRIORITY

This application is a U.S. national-phase application filed under 35 U.S.C. § 371 from International Application Serial No. PCT/EP2022/060300, filed on Apr. 19, 2022, and published as WO 2022/219201 on Oct. 20, 2022, which claims the benefit of priority to EP Application Serial No. 21290022.9, filed on Apr. 16, 2021, each of which is incorporated herein by reference in its entirety.

BACKGROUND

The present application pertains to a message based processor, a message based processing method and a record carrier comprising a computer program, which when executed by a programmable processor causes the programmable processor to perform said method.

Message-based processors address massive computation tasks. A message-based processor comprises a plurality of processor elements that communicate by event-messages. This approach has some similarity to a brain in which neurons are interconnected to each other by synapses, enabling them to transmit data as a spike when their membrane potential (their state) exceeds a pre-defined threshold value. A spike transmitted by a neuron can result in an increase or a decrease of the membrane potential of the recipient neuron. When simulating such a neural network in a message-based processor, massively interconnected neurons are implemented as massively interconnected message-based processing elements in the message-based processor. Upon receipt of an input message the processor element changes its state. Without additional measures, each time a processor cluster element receives an input message, it would transmit a change of state message to its recipient processor cluster elements and in turn the recipient processor cluster elements would experience a change of state and transmit change of state messages to their recipients. This potentially entails the risk that any change results in an overload of messages is generated, which would strongly inhibit computational performance.

In a naïve approach this risk is mitigated by maintaining a double state for each processor element. The double state comprises a previous state and a current state. The current state is the most recent state resulting each time an input message is processed. The previous state serves as a reference state. Only if the effects of the input messages have accumulated to such an extent that the current state differs from the previous state by more than a threshold value the processing element is enabled to transmit a change of state message, and the current state replaces the previous state as the reference state. Whereas this naïve approach indeed provides for a reduction of the number of messages, it is a disadvantage of this approach is however that it requires that the state storage space of the processor elements is doubled because it requires storage space for the previous state in addition to the storage space for the current state.

SUMMARY

Accordingly, it is an object of the present application to provide measures to prevent an overload of messages that only require a modest amount of additional storage space.

This object is achieved in a message-based processor. Therein transmission of output messages for a processor cluster element is temporarily disabled. Upon inhibiting message transmission of the processor cluster element, a second type of message, to be delivered with delay, is directed to that processor cluster element. Upon receipt of the delayed message of the second type, the processor cluster element is re-enabled to transmit output messages. During the time period that message transmission for a processor cluster element is inhibited, its state value is continued to be updated in response to input messages. Only a modest extension of storage space is required. I.e. one bit of storage space is required for a state bit of each processor cluster element to indicate whether message transmission is currently enabled or disabled. Although additional storage space is required to temporarily buffer the messages of the second type until they are delivered, the total requirement for the storage space for the buffer and the state bit is modest in comparison to the additional storage space that would be required for storing a double state for each processor cluster element.

This is because message of the second type are only generated for processor cluster elements that were subject to a significant state change. For example in case the processor cluster elements represent neurons, only for those neurons that already crossed the threshold, a message of the second type needs to be queued. In practice, this is only a small fraction, (e.g. <10%) of the total population of processor cluster elements.

According to a first option an output message for a processor cluster element is transmitted before setting the processor cluster element to the transmission disabling operational mode. According to a second option an output message for a processor cluster element that is operative in its transmission enabling operational mode is not directly transmitted. Instead the transmission is postponed by first setting the processor cluster element to the transmission disabling operational mode and disabling transmission of the output message until the processor cluster element receives the re-enable control message.

In an embodiment a re-enable control message conveys a state value of a processor cluster element at the time of transmission by the processor cluster element and wherein and the processor cluster element only performs preparatory steps for generating an output message if its state value has changed substantially relative to the state value conveyed by a received re-enable control message. In an example thereof the processor cluster elements comprise an additional state register for storing a binary value of a state value change indicator that is indicative for a direction of a previous state change exceeding a threshold value, wherein selectively generating an output event message is further dependent on the value of said indicator.

In an embodiment of the message based processor, the common message handling utilities comprise first message handling utilities to handle update messages to update a state of a processor cluster element designated and a message buffer unit to deliver re-enable control messages. In an example of this embodiment the message buffer unit comprises a FIFO-message buffer and a clock-unit that compares a current time of the day with a time-stamp of the oldest message in said buffer, the message buffer unit being configured to deliver said oldest message if the clock-unit indicates that a predetermined period of time has lapsed since a point in time indicated by said time-stamp. In an example the message buffer unit delivers the oldest message to the designated processing cluster element if the FIFO-message buffer is full, regardless whether or not said predetermined period of time has lapsed.

BRIEF DESCRIPTION OF THE DRAWINGS

These and other aspects are described in more detail with reference to the drawings. Therein:

FIG. 3 shows an exemplary processor cluster in more detail;

DETAILED DESCRIPTION OF EMBODIMENTS

Figure 1:
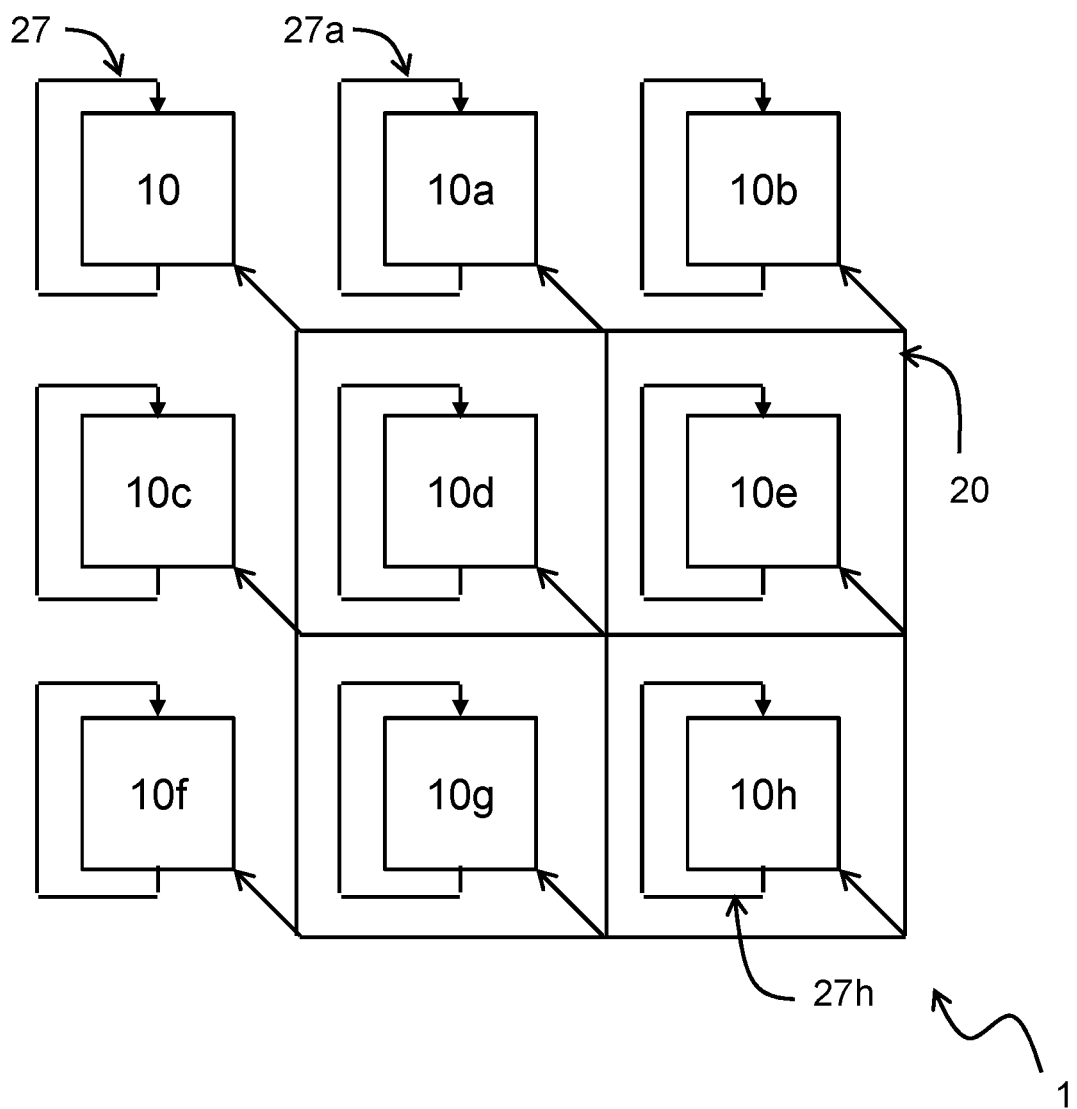
FIG. 1 schematically shows a message based processor that comprises at least one processor cluster.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 schematically shows a message based processor 1 that comprises at least one processor cluster 10, here also processor clusters 10a, . . . , 10h. Each of the processor clusters has a plurality of processor cluster elements a, . . . , j, . . . , n.

Figure 2:
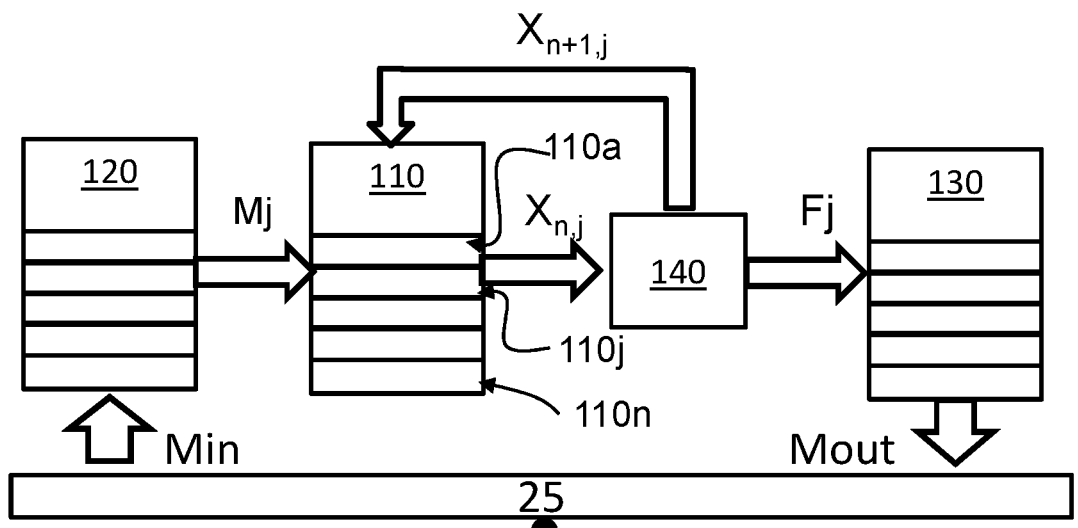
FIGS. 2 and 3 shows an exemplary processor clusters in more detail.

By way of example a processor cluster 10 is shown in more detail in FIG. 2. As shown therein, processor cluster elements a, . . . , j, . . . , n, have a respective addressable storage space 110a, . . . , 110j, . . . , 110n to store a state value Xj indicative for their state. Furthermore, common control utilities, computation utilities 140 and message handling utilities 20, 25, 120, 130, are provided in the processor cluster 10. In this embodiment the common control utilities and the common computation utilities are provided by a general purpose processor 140. Alternatively, separate means may be present, such as a sequencer to function as a common control utility and a signal processor to function as the common computation utility. Such a signal processor may for example be a general purpose processor, but may alternatively be a processor dedicated to perform specific signal computations, for example implemented in dedicated hardware.

The common computation utilities 140 are configured, for example upon receipt of a message Mj addressing a processor cluster element j, to retrieve a previous state $X_{n,j}$ of a processor cluster element j stored in its addressable storage space 110j, and to replace this with the updated state $X_{n+1,j}$. The common computation utilities 140 are also configured to instruct the message output unit 130 with a signal Fj to send one or more output messages Mout.

The message handling utilities comprise a network interface 25 which is connected by a link 20 to a network used by the processor clusters 10, 10a, . . . , 10h to communicate with each other. The message handling utilities further include a message input unit 120 to receive input messages Min and a message output unit 130 to transmit output messages Mout. In addition the message handling utilities comprise a respective dedicated message transfer line 27, 27a, . . . , 27h for each processor cluster 10, 10a, . . . , 10h. If the message based processor 1 only comprises one processor cluster 10, or if message exchange only needs to take place within one processor cluster 10, the network may be absent, and messages can be passed directly from the message output unit 130 to the message input unit 120.

The message input unit 120 is configured to receive input messages Min that designate specific ones of the plurality of processor cluster elements and the computation utilities 140 are configured to update a state value stored in the respective storage element of the designated processor cluster element.

The addressable storage space of each processor cluster element e.g. storage space 110j for a processor cluster element j further stores an operational mode indicator OMj that is indicative for a currently prevailing operational mode of that processor cluster element j. The operational mode OMj is selected from at least one of a first operational mode OME, wherein transmission is enabled and a second operational mode OMD, wherein transmission is disabled. The message output unit 130 is configured to selectively transmit output messages for a processor cluster element to one or more processor cluster elements (e.g. to itself and/or to an processor cluster element in the same processor cluster, or another processor cluster) dependent on its operational mode.

The transmission disabling mode OMD is a temporary operational mode, in that the common control utilities upon setting a processor cluster element to the transmission disabling mode also transmit with delay a re-enable control message to that processor cluster element. Upon receipt of the re-enable control message the processor cluster element reassumes the transmission enable mode OME.

Figure 3:
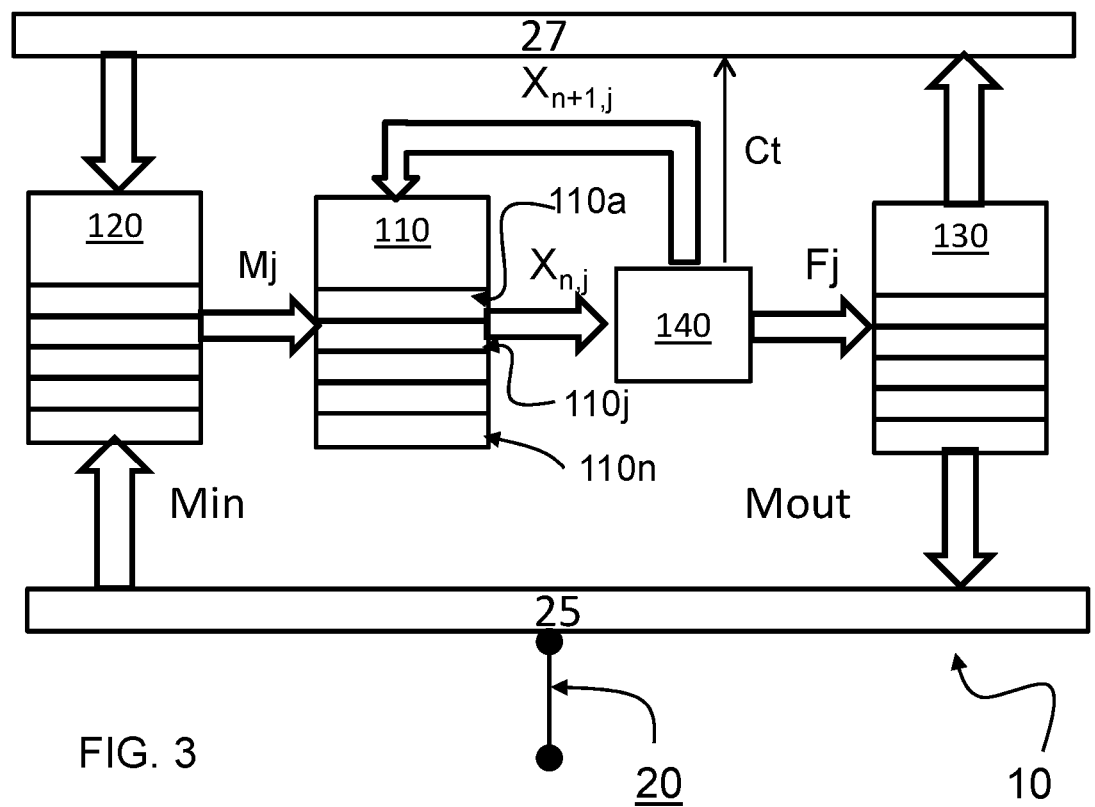

In the embodiment of FIG. 2, the message handling utilities 120, 130, 20, 25 both serve to handle update messages to update a state of a processor cluster element designated therein and re-enable control messages. FIG. 3 shows an alternative embodiment wherein a separate message buffer unit 27 is provided to deliver re-enable control messages. In operation the message buffer unit 27 receives through the message output unit 130 a re-enable control message from a processor cluster element, e.g. j, that designates itself and delivers it to the message input unit 120 with a predetermined delay. It is noted that computation and control utilities 140 may control the duration ΔT of the delay with a control signal Ct for example based on input data indicative for a network load and a required precision indicator.

Figure 4A:
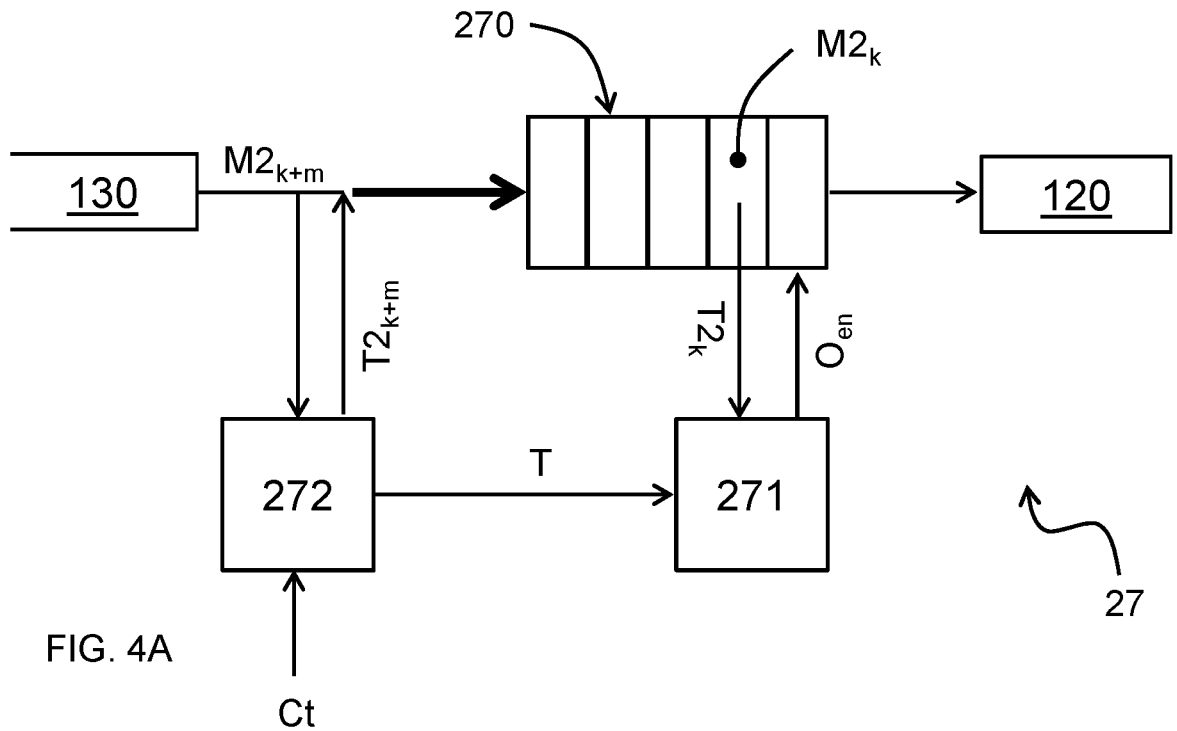
FIG. 4A, 4B shows examples of message handling utilities involved in conveying transmission re-enable messages.

FIG. 4A shows a first example of a message buffer unit 27. The message buffer unit 27 comprises a FIFO-buffer 270, a FIFO-buffer controller 271 and a time stamp section 272. In the example shown, the FIFO-buffer 270 contains buffered re-enable control messages, of which message $M2_k$ having a time stamp $T2_k$ is the oldest. Once a time T, indicated by a clock, here included in the time stamp section 272 is equal to the value of the time stamp T2k of the oldest message, the FIFO-buffer controller 271 issues an output enable control signal $O_{en}$ that causes the FIFO-buffer 270 to deliver the buffered re-enable message $M2_k$ to the message input unit 120. In the embodiment shown, the time stamp section 272 assigns the time-stamp to the received messages. For example the message $M2_{k+m}$ received from the message output unit 130 is provided with a time stamp $T2_{k+m}$, which contains a time value equal to the current time of the day augmented with the predetermined delay time. In other embodiments a time-stamp unit may be included in the message output unit 130 instead.

Figure 4B:
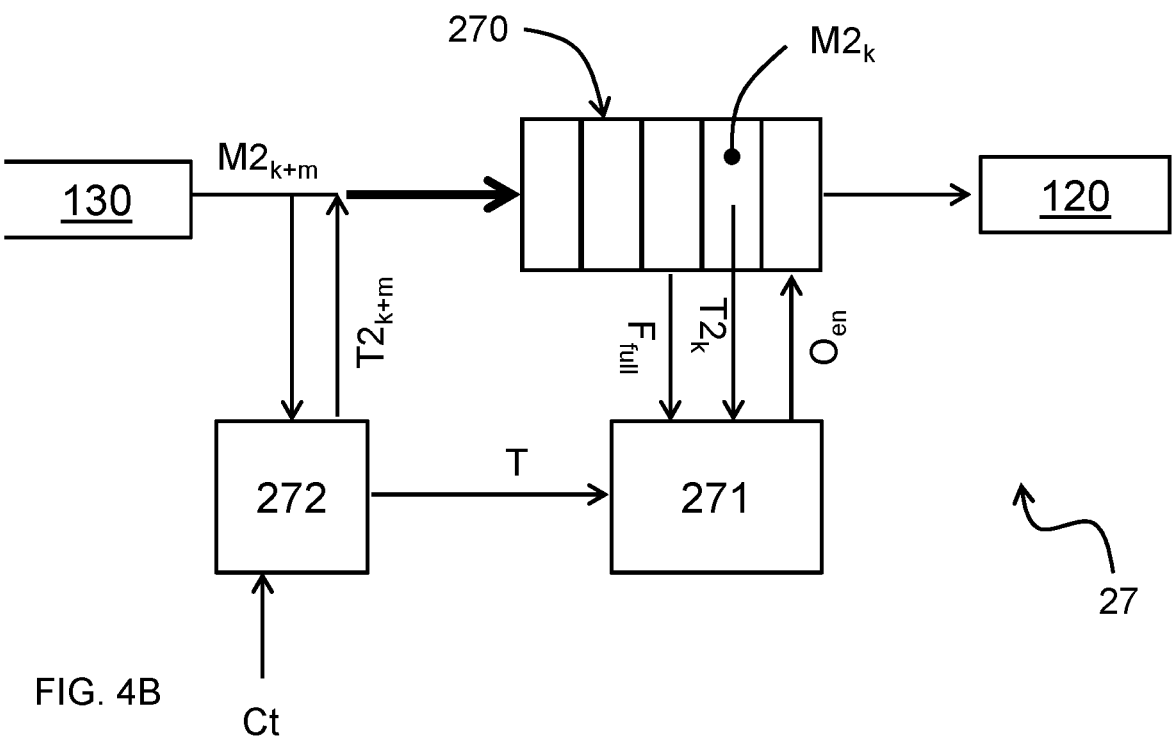

In practice the buffer space available in FIFO-buffer 270 can be designed to be sufficient to hold the re-enable messages for the predetermined delay time. Nevertheless an alternative embodiment is provided in FIG. 4B that provides a fallback operation for the exceptional case that the FIFO-buffer 270 is fully occupied. In this alternative embodiment, the FIFO-buffer controller 271 issues the output enable signal $O_{en}$ if either the time stamp of the oldest message has a value equal to the current time, or if the FIFO-buffer indicates that it is full with the signal $F_{full}$. In the examples of FIG. 4A, 4B, the control signal Ct can be used for used for example to control the delay in that the assigned time-stamp has the value T (current time)+ΔT as a function of the control signal Ct. Therewith the point in time that a re-enable message is released from the FIFO can be shifted to a controllable extent into the future.

Figure 5:
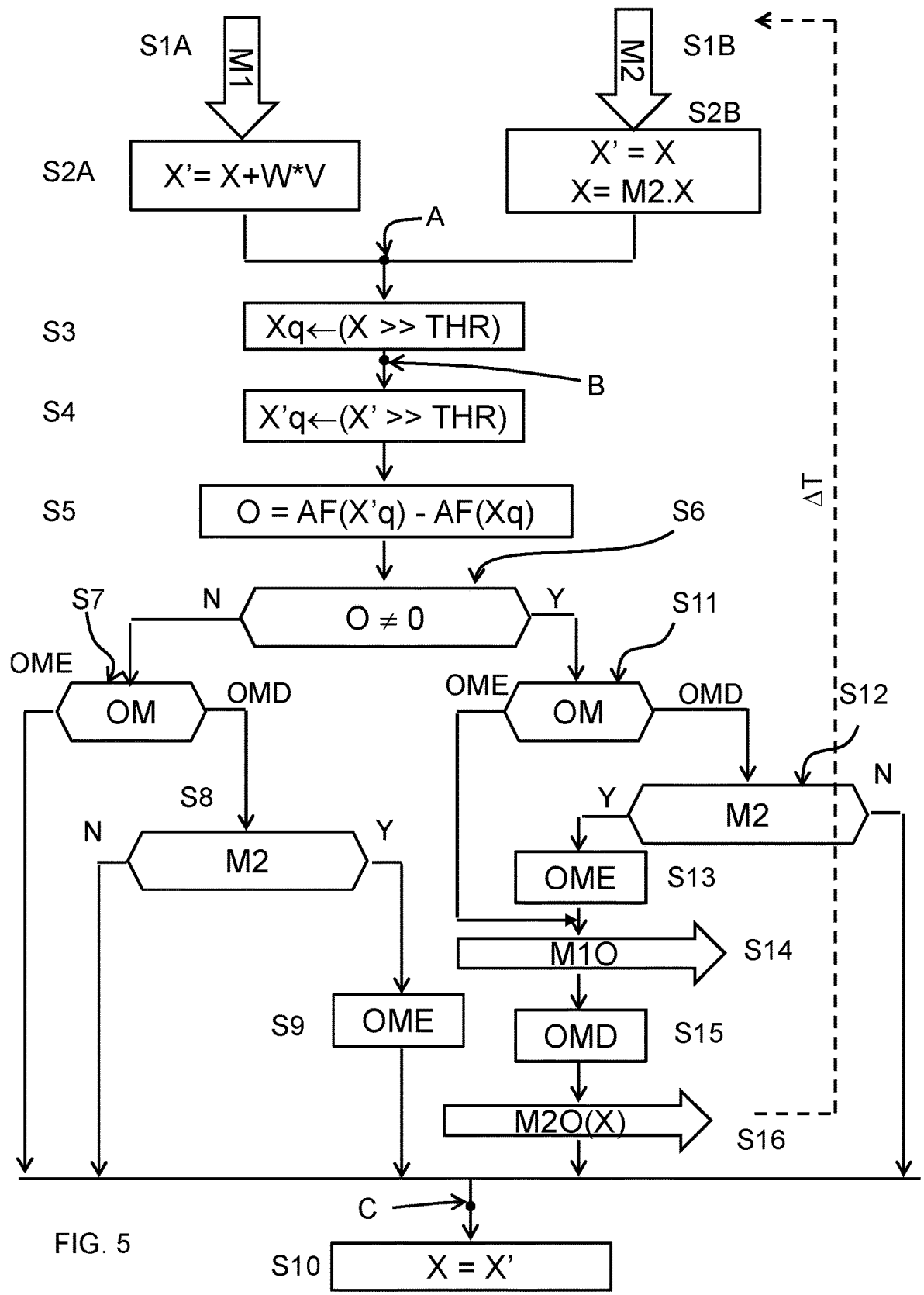
FIG. 5 shows a first example of a method disclosed herein.

FIG. 5 schematically shows an embodiment of a method for operating a message based processor comprising at least one processor cluster with a plurality of processor cluster elements and common control utilities computation utilities and message handling utilities for the processor cluster elements. The message based processor operated with the method is for example one of the embodiments of the message based processor as describe above.

As shown therein, the method comprises a step S1A, or S1B of receiving an input message, e.g. with message input unit 120, that designates a specific one of the plurality of processor cluster elements. In step S1A the received message is an update message M1. An update message M1 may include further data in addition to the designation of the processor cluster element, such as an indication of an operation to be applied and an indication of one or more operand values. This is however not mandatory. Alternatively, in a step S1B, a re-enable message M2 may be received. As will be described in more detail below, the receipt of the message has the effect that the common computation utilities update the state value X stored of the designated processor cluster element. As set out above, the processor cluster 10 has a plurality of processor cluster elements a, . . . , j, . . . n. Accordingly for each of these processor cluster elements a respective state value is stored.

For simplicity the state value Xj of the processor cluster element j that is designated by the message M1 or M2 is indicated as X. Upon receipt of a message M1 in step S1A, the common computation utilities 140 first compute a preliminary updated state value X', which is stored in a shared register. The computation may be controlled by control data, e.g. an opcode and one or more operands in the message M1, but that is not necessary. An embodiment may be contemplated wherein the update message M1 merely contains the designation of the processor cluster element and always has the same effect, e.g. adding a predetermined value to the state value.

Upon receipt of a re-enable message M2, the state value X of the designated processor cluster element is stored as the preliminary updated state value X', and subsequently the state value X is assigned the value (M2.StatVal) which is conveyed by the message M2.

In subsequent steps S3-S5 a quantized state change value O is computed as follows. In step S3 a quantized state value Xq is computed from the value X stored as the current state value of the designated processor cluster element. In this example this is achieved by a shift right operation with THR bits and returning the integer value of the result. The same operation is performed in step S4 for preliminary updated state value X', to obtain the quantized preliminary updated state value Xq'. In step S5, the quantized state change value O is computed as the difference between the activation function value AF(X'q) for the quantized preliminary updated state value Xq' and the activation function value AF(Xq) for the quantized state value Xq.

In step S6 it is determined whether or not the quantized state change value O differs from 0. If the quantized state change value O is equal to 0, the operational state OM of the designated processor cluster element is subsequently checked in step S7. Each processor cluster element has a proper storage space for its operational state. The required storage space is a single bit, unless the operational mode of a processor cluster element needs to be selected from more than two potential operational modes. The storage space for storing the operational mode indicator OM may for example be part of the storage space reserved for the state value X, e.g. an addressable memory entry 110j for processor cluster element j. Upon determining that the operational mode OM is the enabled operational mode OME, the method continues with step S10, wherein the preliminary updated state value X' is stored as the state value X for the designated processor element. In case that the operational mode OM is the disabled operational mode OMD and confirming in step S8 that the received message is not a re-enable message, the method also continues with step S10. If in the disabled operational mode it is determined in step S8 that the received message is a re-enable message then the operational mode of the designated processor element is set as enabled operational mode in step S9, and procedure continues with step S10.

If it is determined in step S6 that the quantized state change value O differs from 0, the operational mode OM of the designated processor cluster element is subsequently checked in step S11. If the operational mode is the disabled operational mode OMD, and it is determined in step S12 that the received message is not a re-enable message, the method continues with step S10. If the operational mode is the enabled operational mode OME, or if it is determined in step S12 that the received message is a re-enable message and re-enabling in step S13, the method continues with step S14, wherein an update message M10, indicative of the quantized state change value O is transmitted by the designated processor element to one or more destination processor cluster elements, which may include itself, one or more other processor cluster elements in the same cluster or in another cluster. The message may be transmitted for example by message output unit 130. Subsequent said transmission, in step S15 the common control utilities 140 reset the operational state of the designated processor cluster element to disabled OMD. Also, in step S16, a re-enable control message M2 is transmitted to the designated processor cluster element with a delay ΔT, as schematically indicated by the dashed arrow in FIG. 5, and the method continues with step S10. As described above, receipt of the message M2 by the designated processor element enables it to reassume the transmission enable mode OME, e.g. in step S9, or in step S13.

Figure 6:
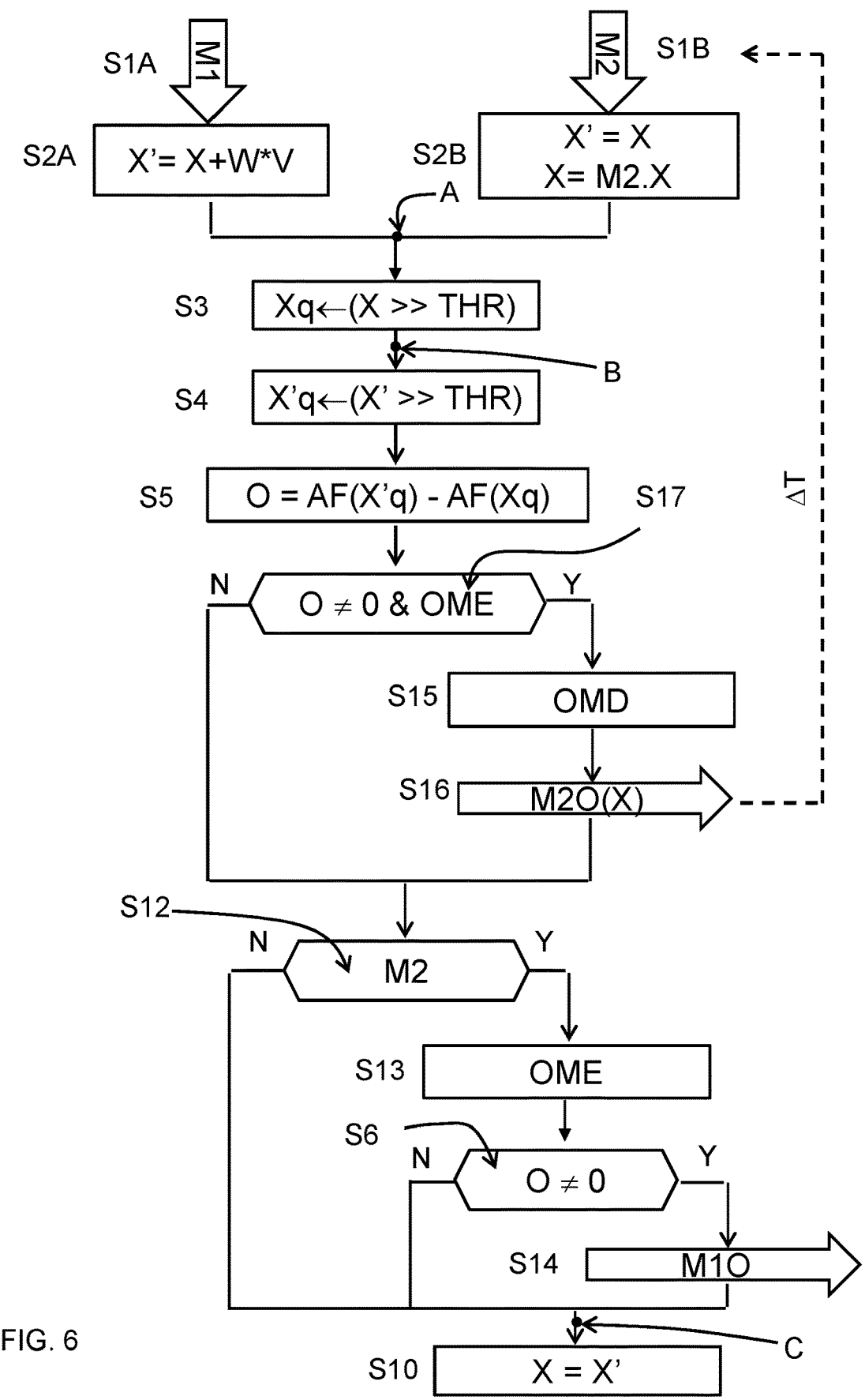
FIG. 6 shows a second example of a method disclosed herein.

FIG. 6 shows an alternative embodiment of the method. Steps therein corresponding to those in FIG. 5 have the same reference number. As becomes apparent from FIG. 6, the procedure followed in this alternative embodiment corresponds to the one until step S17. In step S17, it is checked whether or not the following combination of conditions is complied with:

O≠0 (the quantized state change value O differs from 0)
OM=OME (Transmission enabled mode)

If these both conditions are complied with, the transmission enable mode OM is set disabled (OMD) in step S15, and the transmission re-enable message M2O(X) carrying the current state value X is transmitted in step S16.

Subsequent to step S16, or subsequent to step S17 if it is determined therein that the combination of conditions is not complied with, it is verified in step S12 whether or not a transmission re-enable message M2 was received. If this is not the case the method continues with step S10. If indeed a transmission re-enable message M2 was received, the operational mode OM is switched to OME in step S13. Therewith the processor element is enabled to transmit an update message M10 in step S14, provided that it is determined in step S6 that the quantized state change value O differs from 0.

Figure 7:
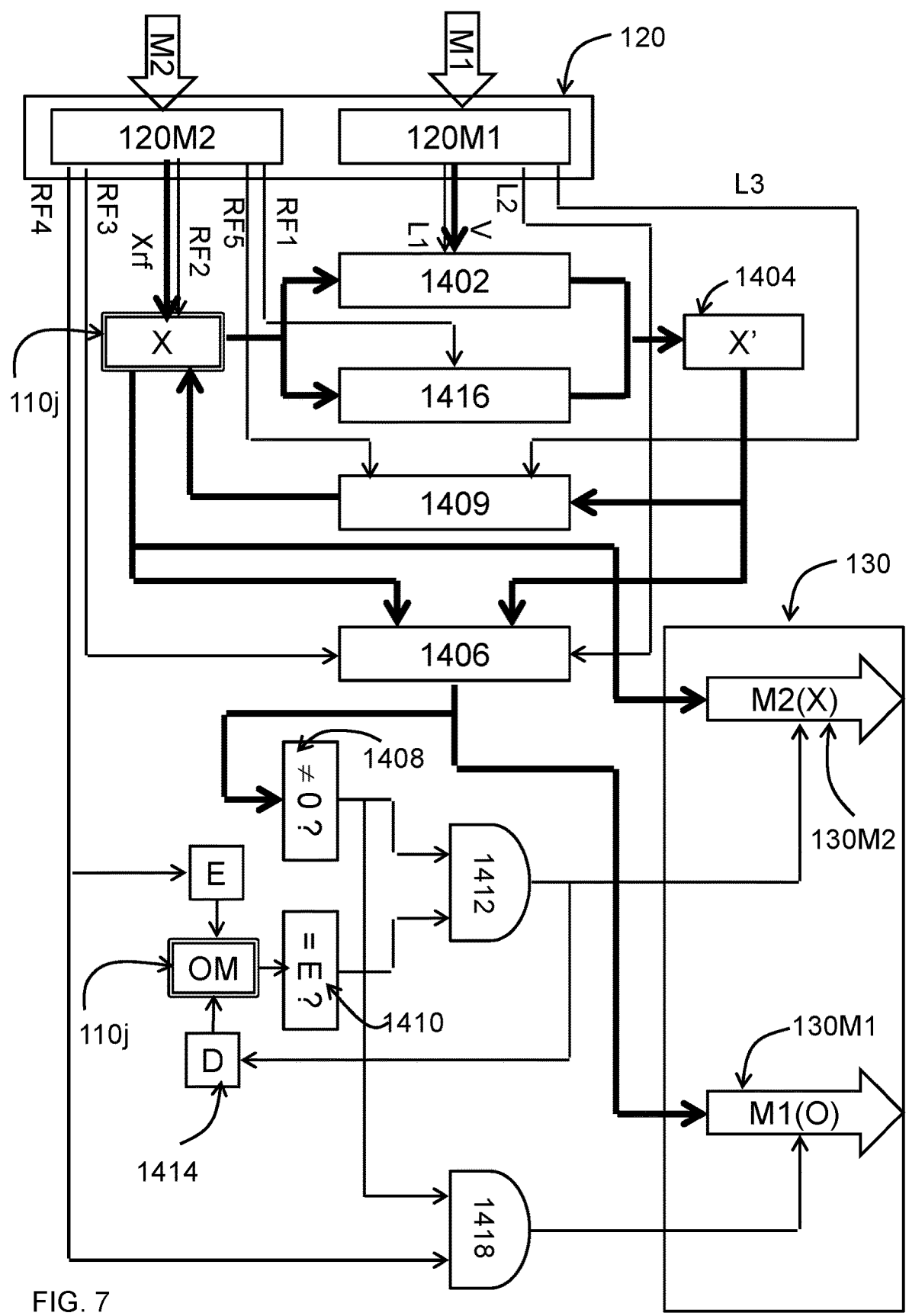
FIG. 7 shows a more detailed example of a portion of an embodiment of a processor clusters.

FIG. 7 schematically illustrates a possible implementation of a common utilities that may perform the method of FIG. 6. By way of example, the common update and control utilities are currently active for a processor cluster element j having its state indicator X and its operational mode indicator OM stored in an addressable entry 110j of a memory 110 (indicated as a double walled box). In the example shown, the common message handling utilities comprise message receiving utilities 120, with a first control module 120M1 and a second control module 120M2. Upon receipt of an input message M1 by the message receiving utilities the first control module 120M1 activates an update module 1402 with control signal L1 to compute an updated state value X' from the value indicated by the state indicator X in entry 110j and a value indicated by the message. E.g. the update module 1402 may compute:

$X' = X + W^*V$, wherein

W is a weight currently assigned to the processor cluster element j, and V a value conveyed by the message M1. Alternatively other update functions may be performed by the update module 1402, for example addition with a fixed value. The value computed by update module 1402 is (temporarily) stored in a register 1404. With a second control signal L2, the first control module 120M1 activates a computation module 1406 to compute a quantized state change value O, for example in accordance with steps S3, S4, S5 in FIGS. 5 and 6. In response to the computation module 1406 having computed the value for the quantized state change value O, a comparator 1408 determines whether the value O differs from 0. Also another comparator 1410 determines whether the operational mode indicator OM stored in entry 110j indicates that transmission is enabled (OME). If the output of AND-gate 1412 indicates that these both conditions are complied with, then disable module 1414 resets the indicator in the transmission enable indicator OM in entry 110j to transmission disabled (OMD). Also in that case, the transmission module 130M2 transmits a message M2(X) with the state value X stored in entry 110j. Control signal L3 from control module 120M1 then causes the storage module 1409 to save the update value X' in the storage entry 110j reserved for the processor cluster element j.

Upon receipt by the message handling utility 120 of message M2(X) after the predetermined delay, the control module 120M2 initiates the following operations. With a signal RF1 it causes module 1416 to copy the current state value X stored in entry 110j into the register 1404. Then with a signal RF2, it stores the state value conveyed by the message M2 into that entry 110j. With control signal RF3, it causes computation utility 1406 to compute the quantized state change value O on the basis of the value conveyed by the message M2, now stored in entry 110j and the value stored in the register 1404. In response to the computation module 1406 having computed the value for the quantized state change value O, the comparator 1408 determines whether the value O differs from 0. Control module 120M2 further provides a control signal RF4 to AND-gate 1418. This control signal indicates "message M2 received=TRUE". If further the comparator 1408 has determined that the value for the quantized state change value O differs from 0 the AND-gate causes signal transmission module 130M1 of the signal handling utilities 130 to issue a message M1(O) conveying quantized state change value O. The message may be transmitted by the designated processor element to one or more destination processor cluster elements, which may include itself, one or more other processor cluster elements in the same cluster or in another cluster. Finally control module 120M2 issues signal RF4 to storage module 1409 to write the temporary updated state value X' into the addressable storage space 110j for the relevant cluster processor element j.

The method as described in FIG. 5 and FIG. 6, may be extended to respond to other message types and to additional message parameters. Examples thereof are presented in FIG. 8. Steps therein corresponding to those in FIG. 5 and FIG. 6 have the same reference. Accordingly, upon receipt of a message M2, the same step S2B is performed as in FIG. 5, and FIG. 6 and the method proceeds from point A in FIG. 5 or FIG. 6 onwards.

If a message M1 is received, then step S2A is performed, wherein the temporary updated state value X' is computed. Then, as an additional step S20 it is determined whether a control parameter "Trig" conveyed by the message M1 is TRUE. If this is not the case, then the method proceeds as usual from point A in FIG. 5 or FIG. 6 onwards. However, if the control parameter "Trig" is True, it resets the quantized state value Xq in step S21, and continues from point B in FIG. 5 or FIG. 6 onwards. This implies that the quantized state change value O is in fact the quantized state value O of the updated value computed in step S2A. Therewith the processor cluster element addressed by the message M1 will communicate an absolute indicator of its state instead of a relative indicator of its state.

Figure 8:
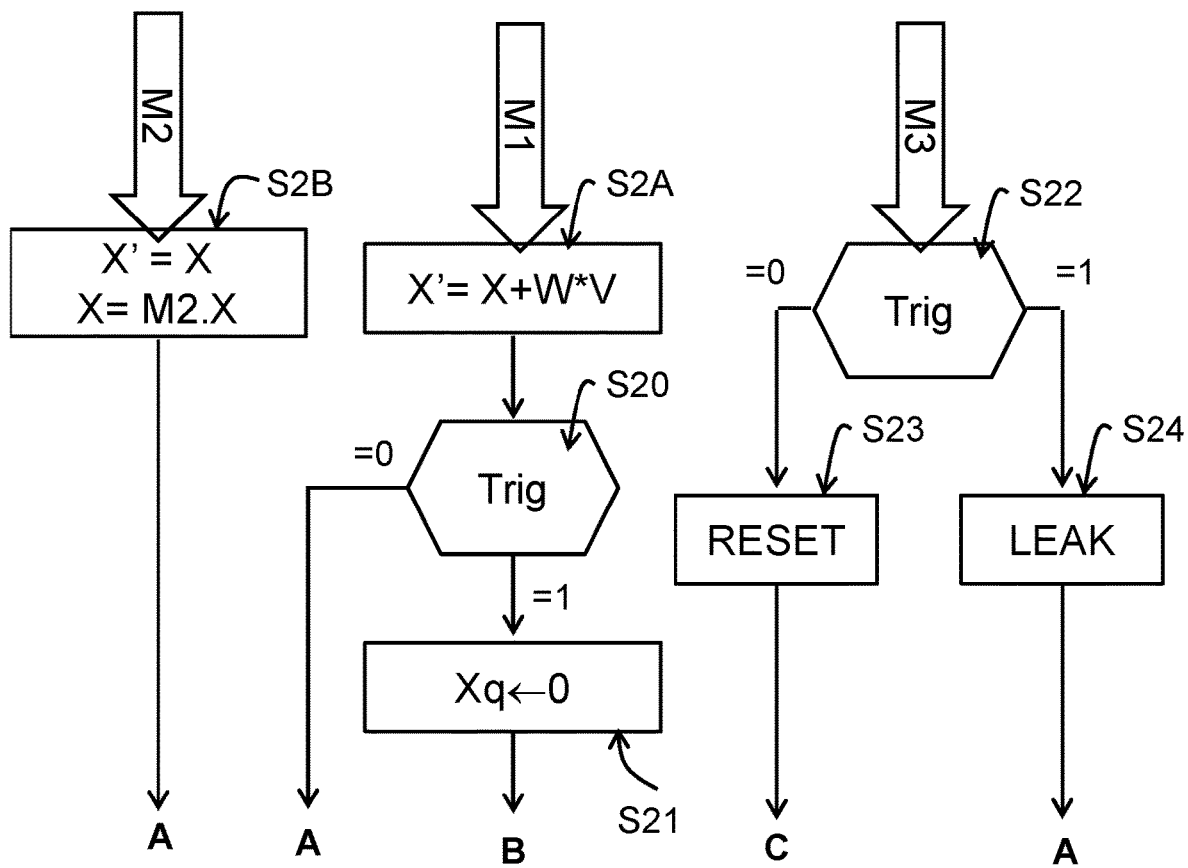
FIG. 8 shows aspects of other embodiments of the method.

As shown also in FIG. 8, the method may be configured to handle a third type of messages M3, for example associated with a separate input port. Upon receipt of a message M3, the method may for example perform a specific operation, such as a reset operation S23 or a leakage operation S24. In the example shown, either of these operations can be performed dependent on the value of the parameter "Trigg". For one value (0) of this parameter, the operation Reset is performed. Therewith the state value is reset to a bias value. The method then continues at point C in FIG. 5 or 6, wherein the computed bias value is stored into the state register (e.g. 110j of a processor cluster element j). In case the parameter "Trigg" has another value (1), a leakage operation is performed. This operation mimics the behavior of a neuron of which the excitation state gradually drops to 0 in the absence of input.

In an embodiment the operations in steps S2A, S23, S24 may be based on a scale function. I.e. the following is computed:

$$\text{In step } S2A: X' = X + \text{Scale}((W - ZP) * V, SC) = X + SC * V(W - ZP)$$

$$\text{In step } S23: X' = X + \text{Scale}((W - ZP), SC) = SC * (W - ZP)$$

$$\text{In step } S24: X' = X - \text{Scale}((X - W), SC) = X - SC * (X - W)$$

In this way, the dynamic range of the cluster can be adapted to the input by the choice of the values for the parameters ZP and SC.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A message based processor having at least one processor cluster, the at least one processor cluster comprising:
a plurality of processor cluster elements, each processor cluster element of the plurality of processor cluster elements having a respective addressable storage space to store a state value indicative of a state of the processor cluster element;
common control utilities;
common computation utilities; and
common message handling utilities,
wherein the addressable storage space of each processor cluster element of the plurality of processor cluster elements further stores an operational mode indicator that is indicative of an operational mode of the processor cluster element, the operational mode being selected from at least one of a first, transmission enabling operational mode and a second, transmission disabling operational mode,
wherein the common message handling utilities are configured to:
receive input messages that designate specific ones of the plurality of processor cluster elements, the common computation utilities being configured to update the state value stored in a respective storage element of each designated processor cluster element of the specific ones of the plurality of processor cluster elements, and
selectively transmit output messages for a particular processor cluster element of the specific ones of the plurality of processor cluster elements to one or more other processor cluster elements of the plurality of processor cluster elements based on the operational mode of the particular processor cluster element,
wherein the common control utilities, upon setting the particular processor cluster element to the transmission disabling operational mode, also cause the common message handling utilities to transmit, with a delay, a re-enable control message to the particular processor cluster element, upon receipt of which the transmission enabling operational mode is to be reassumed.

2. The message based processor according to claim 1, wherein the common control utilities, upon determining that the particular processor cluster element is in the transmission enabling operational mode, are configured to cause the common message handling utilities to transmit an output message before setting the particular processor cluster element to the transmission disabling operational mode.

3. The message based processor according to claim 1, wherein transmission of an output message for the particular processor cluster element in the transmission enabling operational mode is postponed by first setting the particular processor cluster element to the transmission disabling operational mode and disabling transmission of the output message until the particular processor cluster element receives the re-enable control message.

4. The message based processor according to claim 1, wherein the at least one processor cluster with the plurality of processor cluster elements embodies a neural network with neural elements, and wherein the state value corresponds to an action potential.

5. The message based processor according to claim 4, wherein the re-enable control message conveys a state value of the particular processor cluster element at a time of transmission, and wherein the particular processor cluster element only performs preparatory steps for generating an output message if its state value has changed substantially relative to the state value conveyed by the re-enable control message.

6. The message based processor according to claim 5, wherein an additional state register stores a binary value of a state value change indicator that is indicative of a direction of a previous state change exceeding a threshold value with respect to the particular processor cluster element, wherein selectively transmitting the output messages is further based on the binary value of the state value change indicator for the particular processor cluster element.

7. The message based processor according to claim 1, wherein the common message handling utilities comprise a first message handling utility to handle update messages to update a state of each designated processor cluster element of the specific ones of the plurality of processor cluster elements and a message buffer unit to deliver re-enable control messages.

8. The message based processor according to claim 7, wherein the message buffer unit comprises a FIFO-message buffer and comprises a clock-unit that compares a current time of a day with a time-stamp of an oldest message in the FIFO-message buffer, the message buffer unit being configured to deliver the oldest message if the clock-unit indicates that a predetermined period of time has lapsed since a point in time indicated by the time-stamp.

9. The message based processor according to claim 8, wherein the message buffer unit delivers the oldest message if the FIFO-message buffer is full, regardless of whether or not the predetermined period of time has lapsed.

10. A method for operating a message based processor comprising at least one processor cluster with a plurality of processor cluster elements and common control utilities, common computation utilities, and common message handling utilities for the plurality of processor cluster elements, each processor cluster element of the plurality of processor cluster elements having a respective addressable storage space to store a state value indicative of a state of the processor cluster element and an operational mode indicator that is indicative of an operational mode of the processor cluster element, the operational mode being selected by the common control utilities from at least one of a first, transmission enabling operational mode and a second, transmission disabling operational mode, the method comprising:

receiving an input message that designates a specific one of the plurality of processor cluster elements;

updating, by the common computation utilities, the stored state value of the designated processor cluster element; and based on the operational mode of the designated processor cluster element, selectively transmitting, by the message handling utilities, output messages directed from the designated processor cluster element to one or more other processor cluster elements of the plurality of processor cluster elements, wherein the common control utilities, upon setting the designated processor cluster element to the transmission disabling operational mode, also cause the common message handling utilities to transmit, with a delay, a re-enable control message to the designated processor cluster element, upon receipt of which the transmission enabling operational mode is to be reassumed.

11. The method according to claim 10, wherein the common control utilities, upon determining that the designated processor cluster element is in the transmission enabling operational mode, are configured to cause the common message handling utilities to transmit an output message before setting the designated processor cluster element to the transmission disabling operational mode.

12. The method according to claim 10, wherein the common control utilities, upon determining that the designated processor cluster element is in the transmission enabling operational mode, are configured to cause the common message handling utilities to postpone transmission of an output message for the designated processor cluster element by first setting the designated processor cluster element to the transmission disabling operational mode and to enable transmission of the output message when the designated processor cluster element receives the re-enable control message.

13. The method according to claim 10, wherein the at least one processor cluster with the plurality of processor cluster elements executes a neural network with neural elements, and wherein the state value corresponds to an action potential.

14. The method according to claim 13, wherein the designated processor cluster element executes a particular neural element of the neural elements, and wherein selectively transmitting an output message for the designated processor cluster element is further subject to the action potential of the particular neural element having changed substantially.

15. The method according to claim 14, further comprising dynamically controlling a duration of the delay with which the re-enable control message is transmitted.

16. A non-volatile record carrier, comprising a computer program, which when executed by a programmable processor causes the programmable processor to perform the method of claim 10.

17. The method according to claim 10, wherein an additional state register stores a binary value of a state value change indicator that is indicative of a direction of a previous state change exceeding a threshold value with respect to the designated processor cluster element, wherein selectively transmitting the output messages is further based on the binary value of the state value change indicator for the designated processor cluster element.

18. The method according to claim 10, wherein the common message handling utilities comprise a first message handling utility to handle update messages to update a state of the designated processor cluster element and a message buffer unit to deliver re-enable control messages.

19. The method according to claim 18, wherein the message buffer unit comprises a FIFO-message buffer and comprises a clock-unit that compares a current time of a day with a time-stamp of an oldest message in the FIFO-message buffer, the message buffer unit being configured to deliver the oldest message if the clock-unit indicates that a predetermined period of time has lapsed since a point in time indicated by the time-stamp.

20. The method according to claim 19, wherein the message buffer unit delivers the oldest message if the FIFO-message buffer is full, regardless of whether or not the predetermined period of time has lapsed.

* * * * *